(12) United States Patent
Sakai (10) Patent No.: US 8,047,938 B2
(45) Date of Patent: Nov. 1, 2011

(54) TRANSMISSION DEVICE OF WALKING TYPE SELF-TRAVELING LAWN MOWER

(75) Inventor: Shin-ichi Sakai, Okayama (JP)

(73) Assignee: Kaaz Corporation, Okayama-Ken (JP)

( * ) Notice: Subject to any disclaimer, the term of this patent is extended or adjusted under 35 U.S.C. 154(b) by 658 days.

(21) Appl. No.: 12/223,364

(22) PCT Filed: Feb. 6, 2007

(86) PCT No.: PCT/JP2007/052014
§ 371 (c)(1),
(2), (4) Date: Jul. 29, 2008

(87) PCT Pub. No.: WO2007/094201
PCT Pub. Date: Aug. 23, 2007

(65) Prior Publication Data
US 2009/0054184 A1    Feb. 26, 2009

(30) Foreign Application Priority Data
Feb. 16, 2006 (JP) .................... 2006-038780

(51) Int. Cl.
*F16H 7/08* (2006.01)
(52) U.S. Cl. .......... 474/111; 474/212; 474/152; 56/17.5
(58) Field of Classification Search .................. 474/111, 474/212, 152; 56/11.9, 17.5, 12.7, 12.1, 56/16.9, 11.4; 180/19.3
See application file for complete search history.

(56) References Cited

U.S. PATENT DOCUMENTS

| 2,513,685 | A |   | 7/1950  | Smith et al. |
| 2,897,645 | A |   | 8/1959  | Veillette |
| 5,174,100 | A | * | 12/1992 | Wassenberg .......... 56/12.7 |
| 5,224,552 | A | * | 7/1993  | Lee et al. ............ 172/52 |
| 5,353,881 | A | * | 10/1994 | Lee et al. ............ 172/52 |
| 5,377,774 | A | * | 1/1995  | Lohr .................. 180/19.3 |
| 5,778,645 | A |   | 7/1998  | Irikura et al. |
| 5,800,301 | A |   | 9/1998  | Anderson |
| 6,155,035 | A | * | 12/2000 | Merritt, III .......... 56/16.9 |
| 7,661,503 | B2 | * | 2/2010  | Weagle ............... 180/226 |
| 2003/0182917 | A1 |   | 10/2003 | Wadzinski |

FOREIGN PATENT DOCUMENTS

| EP | 1 219 156 A | 7/2002 |
| JP | 58-105824   | 7/1983 |
| JP | 59-62735    | 4/1984 |

(Continued)

*Primary Examiner* — Emmanu M Marcelo
(74) *Attorney, Agent, or Firm* — DLA Piper LLP (US)

(57) ABSTRACT

A transmission device (1) of a walking type self-traveling lawn mower (4) in which the reliable transmission of a rotating power is achieved as in the case of a shaft drive system by solving the problem of the durability of the transmission belt of conventional transmission devices while basically adopting the transmission device of a belt drive system. The transmission device (1) comprises a chain drive mechanism (2) and a rotating direction changing mechanism (3). The chain drive mechanism (2) is constituted by winding a transmission chain (23) around a drive sprocket (21) fitted to an output shaft (411) and rotating horizontally and a driven sprocket (22) connected to the rotating direction changing mechanism (3) and rotating horizontally. The rotating direction changing mechanism (3) comprises a drive bevel gear (31) coaxial with the driven sprocket (22) rotating horizontally, a driven bevel gear (32) meshed with the drive bevel gear (31) rotating vertically, and an auxiliary output shaft (33) coaxial with the driven bevel gear (32) rotating vertically.

5 Claims, 9 Drawing Sheets

FOREIGN PATENT DOCUMENTS

| JP | 61-133157 | 8/1986 |
| JP | 63-9819 | 1/1988 |
| JP | 2-31422 | 2/1990 |
| JP | H05-280604 A | 10/1993 |
| JP | 9-74857 | 3/1997 |
| JP | 9-220012 | 8/1997 |
| JP | H11-146719 A | 6/1999 |

* cited by examiner

TRANSMISSION DEVICE OF WALKING TYPE SELF-TRAVELING LAWN MOWER

TECHNICAL FIELD

The present invention relates to a transmission device of a walking type self-traveling lawn mower whose transmission efficiency of a rotating power is as reliable as that of a transmission device of a shaft drive system. That is realized by solving the problem of the durability of transmission belts of conventional transmission devices having a belt drive system.

BACKGROUND ART

The walking type self-traveling lawn mower (hereinafter abbreviated as "lawn mower") rotates a lawn mowing blade and drive wheels and thereby self-travels with the rotating power from a prime mover. A worker can walk and operate as holding an operation handle on a vehicle body of the lawn mower for stating-up and stopping the drive wheels, and changing direction to left or right. Such lawn mower branches the rotating power from the prime mover to the lawn mowing blade and the drive wheels. With respect to an output shaft of the prime mover, the lawn mowing blade is directly connected to said output shaft via a clutch and a brake device. The drive wheels are connected to the said output shaft via a transmission device for branching the rotating power from the output shaft.

The transmission device can be roughly classified according to the system branching the rotating power from the output shaft. Specifically, one is a transmission device of a configuration in which a shaft is connected to an auxiliary output shaft operating in conjunction with an output shaft of the prime mover (hereafter referred to as "shaft drive system", shown in patent document 1 and patent document 2), and another is a transmission device of a configuration in which a drive pulley is attached to an output shaft of the prime mover, a driven pulley is attached to drive wheels, and a transmission belt is bridged across said drive pulley and said driven pulley (hereafter referred to as "belt drive system", shown in patent document 3 and patent document 4). The usage of them differs depending on various situations, but generally, the large and expensive lawn mower adopts the shaft drive system, and the small and inexpensive lawn mower adopts the belt drive system.

As seen in patent document 1, in the transmission device of the shaft drive system, a reducing mechanism incorporated in the prime mover has an auxiliary output shaft, where the reduced rotating power is retrieved from the auxiliary output shaft, and the retrieved reduced rotating power is transmitted to the drive wheels by a transmission shaft coupled to the auxiliary output shaft and an universal joint. As seen in patent document 2, a configuration may also be adopted in which the auxiliary output shaft is connected to the output shaft via a simple worm gear mechanism, and then the auxiliary output shaft and the reducing mechanism arranged in the drive wheels are connected. In this case, the reducing mechanism arranged in the drive wheels may sometimes be a hydraulic stepless speed change device.

In the transmission device of the belt drive system, the drive pulley is attached to the output shaft of the prime mover, the driven pulley is attached directly to the drive wheels or to the reducing mechanism arranged in the drive wheels, and the transmission belt is wound around the drive pulley and the driven pulley so that rotating power is transmitted by the transmission belt. When winding the transmission belt around the driven pulley directly attached to the drive wheels, the radius ratio of the drive pulley and the driven pulley becomes the reduction ratio. As seen in patent document 3, the transmission device of the belt drive system has a feature in that the rotating power of the output shaft rotating horizontally can be converted to the rotating power of the drive wheels rotating vertically by twisting the transmission belt.

Patent document 1: Japanese Published Utility Model Publication No. 59-062735
Patent document 2: Japanese Published Utility Model Publication No. 63-009819
Patent document 3: Japanese Published Utility Model Publication No. 58-105824
Patent document 4: Japanese Published Utility Model Publication No. 02-031422

DISCLOSURE OF THE INVENTION

Problem to be Solved by the Invention

The transmission device of the shaft drive system has advantages in that the durability of the transmission shaft is high, maintenance is hardly needed, and the rotating power can be reliably transmitted, but has disadvantages in that the configuration is complicating as there is a need for a dedicated prime mover equipped with the auxiliary output shaft or to arrange the auxiliary output shaft on a general purpose prime mover, and the manufacturing cost is high, and thus it is normally used only in a relatively expensive or large lawn mower. The transmission device of the belt drive system, on the other hand, can be easily configured by simply attaching the drive pulley to the output shaft of the prime mover while using the general purpose prime mover, and the manufacturing cost is low, and thus it can be widely used in a relatively inexpensive or small lawn mower. The fact that products with low manufacturing cost tend to be widespread is also true to lawn mowers and thus the lawn mowers being sold are predominantly belt drive system. One of the factors that create the difference in manufacturing costs of the two systems is that the manufactured quantity of the dedicated prime mover of the shaft drive system is small.

Therefore, the transmission device of belt drive system which can use the general purpose prime mover, which configuration is simple, and which manufacturing cost is low appears to be superior, but the transmission device of the belt drive system has a fatal problem in that the durability of the transmission belt is low. A cause thereof is that the transmission belt slides with respect to the drive pulley or the driven pulley and wears out. The sliding of the transmission belt can be suppressed by using a tension pulley, but in this case, the tension pulley bends the circling path of the transmission belt thereby degrading the transmission belt. Thus, in any case, the durability of the transmission belt lowers by wear or bend.

Therefore, a new transmission device is examined in which the transmission of a rotating power as reliable as that of shaft drive system is achieved, the transmission device of the belt drive system capable of using the general purpose prime mover is adopted, the problem of the durability of the transmission belt of the transmission devices adopting a belt drive system is solved.

Means for Solving the Problem

As a result of the examination, there is developed a transmission device of a walking type self-traveling lawn mower for branching a rotating power from an output shaft vertically projected from a prime mover mounted on a vehicle body and attached with a horizontally rotating lawn mowing blade and transmitting said rotating power to a drive wheels, the transmission device of the walking type self-traveling lawn mower including a chain drive mechanism and a rotating direction changing mechanism; wherein the chain drive mechanism is constituted by winding a transmission chain around a drive sprocket fitted to the output shaft and rotating horizontally and a driven sprocket connected to the rotating direction changing mechanism and rotating horizontally; and the rotating direction changing mechanism is constituted by a drive bevel gear coaxial with the driven sprocket rotating horizontally, a driven bevel gear meshed with the drive bevel gear rotating vertically, and an auxiliary output shaft coaxial with the driven bevel gear rotating vertically.

The transmission device of the present invention is a hybrid transmission device enabling the use of the shaft drive system on the general purpose prime mover of the transmission device of the belt drive system by combining the chain drive mechanism which can be referred to as the chain drive system as opposed to the belt drive system, and the rotating direction changing mechanism. That is, the chain drive mechanism of the chain drive system transmits the rotating power of horizontal rotation from the output shaft of the prime mover up to the position not interfering with the prime mover, and the transmission shaft used in the shaft drive system transmits the rotating power from the position where the rotating power of horizontal rotation is converted to vertical rotation by the rotating direction changing mechanism. The auxiliary output shaft and the drive wheels are connected with the transmission shaft of shaft drive system, and various means known in the prior art are used to connect the transmission shaft to the drive wheels. The transmission shaft then may be connected to a reducing mechanism arranged in the drive wheels.

Since the lawn mower using the transmission device of the belt drive system has the transmission belt interposed between the prime mover and the lawn mowing blade, the transmission belt can be easily replaced with the transmission chain used in the transmission device of the present invention. This means that the transmission device of the present invention can be easily replaced with an already installed transmission device of the belt drive system. Furthermore, the transmission chain used in the transmission device of the present invention merely needs to transmit the rotating power up to the position that does not interfere with the prime mover, or normally, the rotating direction changing mechanism arranged on the side surface of the prime mover. Therefore, the circling path of the transmission chain can be shortened up to about ⅓ to ½ of the length of conventional transmission belt. Since the transmission chain itself is strong compared to the transmission belt, it has an advantage in that the durability as power transmitting means is high. Moreover, the transmission chain is less likely to degrade over ages and can transmit stable rotating power, and the following rotating direction changing mechanism can also transmit stable rotating power, and thus the transmission of the rotating power stabilizes in the transmission device of the present invention as a whole.

Since the transmission chain of the chain drive mechanism has a short circling path, as described above, the chain drive mechanism of the present invention preferably has an inner side or an outer side of the circling path of the transmission chain pressed by a chain tensioner to prevent loosening of the transmission chain in order to stabilize the transmission of the rotating power. The tensioner may be pivotally attached to an attachment case (to be hereinafter described) for accommodating the transmission chain, and is desirably pressed against the transmission chain from the inner periphery that meshes with the drive sprocket and the driven sprocket.

In the chain drive mechanism, the drive sprocket is preferably attached to the output shaft without particularly working the output shaft of the prime mover. Therefore in the chain drive mechanism, the drive sprocket is attached to the output shaft by forming a male screw at a lower portion of a reverse circular cone shaped outer peripheral surface of a taper ring, externally fitting the taper ring, having a slit dividing the outer peripheral surface and the male screw in the peripheral direction, to the output shaft of the prime mover, externally fitting the drive sprocket to the outer peripheral surface of the taper ring, screw fitting a tightening nut having a female screw formed on an inner peripheral surface to the male screw of the taper ring, bonding the taper ring with pressure to the output shaft by the screw-fitting of the tightening nut, and sandwiching the drive sprocket with the taper ring and the tightening nut.

Also, in the chain drive mechanism, the drive sprocket can be attached to the output shaft by externally fitting a drive sprocket having a female screw formed at a lower portion of an inner peripheral surface to the output shaft, inserting a circular cone shaped taper ring having a slit dividing a circular cone shaped outer peripheral surface in the peripheral direction between the output shaft of the prime mover and the inner peripheral surface of the drive sprocket, screw fitting a tightening nut having a male screw formed on an outer peripheral surface to the female screw of the drive sprocket, and fitting the taper ring with pressure between said output shaft of the prime mover and said inner peripheral surface of the drive sprocket by the screw-fitting of said tightening nut. In the above described configuration, the drive sprocket is merely fixed with pressure to the output shaft via the taper ring, and in the previously described configuration, the taper ring is merely fitted with pressure between the output shaft of the prime mover and the inner peripheral surface of the drive sprocket. Therefore, when the transmission device breaks, these configurations are advantageous in that the drive sprocket goes around in circles, thereby the output shaft, the prime mover and other parts are prevented from being damaged when the transmission device breaks. Furthermore, it is also advantageous in that the transmission device itself including the drive sprocket can be easily detached from the lawn mower by loosening the tightening nut.

When using the transmission device of the present invention, the reducing mechanism may be arranged in the drive wheels to reduce the rotation number of the rotating power, as previously described. However, if the chain drive mechanism also serves as a reducing mechanism by setting a gear ratio of the driven sprocket with respect to the drive sprocket to greater than one, the rotation number of the rotating power can be reduced at the gear ratio, that is, the percentage of the reduction ratio. The practical gear ratio in the chain drive mechanism may be about five at maximum since the rotation number of the rotating power can also be reduced by the rotating direction changing mechanism as hereinafter described.

The transmission chain of the chain drive mechanism merely needs to be a conventionally known general chain, but a silent chain is preferably used. The silent chain has an advantage of having silence property of silently circling compared to the conventional general chain, thereby contributing to enhancement in silence of the transmission device and furthermore in silence of the lawn mower, so that the lawn mower equipped with the transmission device of the present invention can be used in residential areas and the like.

The chain drive mechanism and the rotating direction changing mechanism constituting the transmission device of the present invention may be attached to the vehicle body or the prime mover of the lawn mower as separate bodies. However, the attachment of the transmission device with respect to the vehicle body or the prime mover is facilitated with the transmission device in which the chain drive mechanism and the rotating direction changing mechanism are integrated by having the chain drive mechanism accommodate the drive sprocket, the driven sprocket, and the transmission chain in a flat attachment case fixed to the vehicle body or the prime mover, and fixing the rotating direction changing mechanism on an upper surface of the attachment case, immediately above the driven sprocket. When a chain tensioner is applied to the chain drive mechanism, the chain tensioner is also accommodated in the attachment case. The attachment case has a function of protecting the chain drive mechanism and specifying the positional relationship of the chain drive mechanism and the rotating direction changing mechanism.

A bolt hole for fixing the housing of the lawn mowing blade to the vehicle body or the prime mover may be used to fix the attachment case to the vehicle body or the prime mover. For instance, the attachment case may be fixed to the vehicle body or the prime mover by communicating the attachment hole formed in the attachment case and the attachment hole formed in the housing of the lawn mowing blade, and passing the attachment bolt through both attachment holes and screw-fitting the passed bolt to the bolt hole of the vehicle body or the prime mover. The attachment case can also be fixed to the vehicle body or the prime mover by screw-fitting a stud bolt (tap-end bolt) in the bolt hole formed in the vehicle body or the prime mover, and passing the tap-end bolt through the attachment hole formed in the attachment case and the attachment hole formed in the housing of the lawn mowing blade and tightening with a nut. In either case, the pass-through of the attachment bolt and the tightening of the nut with respect to the stud bolt are facilitated if the upper surface of a attachment base is projected from the lower surface, and the attachment hole is formed in the upper surface.

The attachment case normally has a sealed structure in an aim of protecting the chain drive mechanism. Thus, if the lubricant is filled in the attachment case, the circling of the transmission chain becomes smooth, and rust prevention of the drive sprocket, the driven sprocket and the transmission chain can be achieved. However, if the attachment case is completely sealed, the pressure in the attachment case increases by the circling of the transmission chain, whereby the lubricant leaks out, and in the worst case, the attachment case may burst. In this case, provision of a separately arranged pressure escape hole or a separately arranged relief valve is usable while completely sealing the attachment case. However, easy, convenient, and practical configuration of the attachment case is such where an opening enabling the output shaft of the prime mover to pass therethrough is formed on the upper surface and the lower surface, the opening formed on the upper surface passes the output shaft without attaching a seal ring, the opening formed on the lower surface attaches a seal ring, and the seal ring slidably contacts to the output shaft and closes the opening; and the attachment case in the sealed state is filled with semisolid or paste lubricant.

The attachment case realizes a sealed state by forming an opening on the upper surface and the lower surface to pass the output shaft through the attachment case accommodating the transmission chain etc., wherein the opening formed in the upper surface merely passing the output shaft and pressing the upper surface against the vehicle body or the prime mover, the opening formed on the lower surface being attached with the seal ring and slidably contacting the seal ring to the output shaft and closing the same. In this sealed state, the pressure can escape from the opening of the upper surface when the pressure in the attachment case becomes high. Thus, the lubricant filled in the attachment case is suppressed from moving downward with the pressure escape, and is prevented from leaking out along the output shaft to which the seal ring merely slidably contacts. However, since the attachment case overturns with the vehicle body, in maintenance and cleaning of the lawn mowing blade, the present invention fills the attachment case with semisolid or paste lubricant for the lubricant that does not leak out when the attachment case is overturned.

The auxiliary output shaft of the rotating direction changing mechanism can be projected from the driven bevel gear slightly tilting in the up or down direction according to the mesh relationship of the drive bevel gear and the driven bevel gear, but the positional relationship of the auxiliary output shaft, the drive wheels and the reducing mechanism arranged in the drive wheels when the transmission device is actually installed is not uniform. Therefore, it is preferable that the rotating direction changing mechanism has a universal joint arranged on the auxiliary output shaft, and the transmission shaft is connected to the universal joint. If the rotating direction changing mechanism is installed on the rear surface side of the prime, mover with respect to the advancing direction of the lawn mower, and the auxiliary output shaft is projected backward from the rotating direction changing mechanism, the auxiliary output shaft arranged with the universal joint can be connected with the existing transmission shaft, and the transmission device of the shaft drive system can be replaced with the transmission device of the present invention. In addition, the rotating direction changing mechanism also serves as a reducing mechanism by setting a gear ratio of the driven bevel gear with respect to the drive bevel gear to greater than one. The practical gear ratio in the rotating direction changing mechanism may be about five at maximum.

EFFECT OF THE INVENTION

The present invention resolves the problem of the durability of the transmission belt of the belt drive system while basically adopting the transmission device of the belt drive system capable of using a general purpose prime mover. The present invention also resolves the problem of reliably transmitting the rotating power at the similar level of the shaft drive system by enabling the use of the shaft drive system on the general purpose prime mover of the transmission device of the belt drive system by adopting a hybrid system combining the chain drive mechanism referred to as the chain drive system as opposed to the belt drive system and the rotating direction changing mechanism. This means that the shaft drive system can be adopted using the transmission device of the present invention, whereby the manufacturing cost of the lawn mower adopting the shaft drive system can be reduced.

Since the chain drive mechanism merely circles the transmission chain with high mechanical strength on a short circling path, the transmission of the rotating power becomes stable and reliable. The transmission of the rotating power by the transmission chain becomes more stable and reliable with the simultaneous use of the chain tensioner and the use of the silent chain. The configuration of attaching the drive sprocket to the output shaft using the taper ring and the tightening nut eliminates working of the output shaft, and prevents the influence of defects on the vehicle body or the prime mover (fail safe) by having the drive sprocket go around in circles when defects occur in the transmission device. The attachment case realizes unity as the transmission device, and facilitates the handling of the transmission device. The attachment case merely has the upper surface formed with the opening for passing the output shaft pressed against the vehicle body or the prime mover, so that the pressure in the attachment case can escape from the opening.

The rotating direction changing mechanism enables the use of the transmission device of the shaft drive system of the prior art in the present invention by arranging the universal joint on the auxiliary output shaft. In addition, the chain drive mechanism sets the gear ratio of the driven sprocket with respect to the drive sprocket to greater than one, and the rotating direction changing mechanism sets the gear ratio of the driven bevel gear with respect to the drive bevel gear to greater than one so as to respectively serve as the reducing mechanism, and reduce the rotation speed in a step-wise manner in transmission of the rotating power. Thus the drive wheels is simply arranged with a compact reducing mechanism suppressed with the reduction ratio, thereby contributing to lighter weight and miniaturization of the lawn mower. Therefore, the transmission device of the present invention not only enables the use of the shaft drive system while using the general purpose prime mover, but also has an effect of improving the transmission mode itself of the rotating power.

EXPLANATION OF REFERENCE NUMERALS 1 transmission device
2 chain drive mechanism
21 drive sprocket
212 taper ring
213 tightening nut
22 driven sprocket
23 transmission chain
24 attachment case
241 upper surface case
242 lower surface case
2425 seal ring
25 drive sprocket
252 taper ring
253 tightening nut
3 rotating direction changing mechanism
31 drive bevel gear
32 driven bevel gear
33 auxiliary output shaft
4 walking type self-traveling lawn mower
41 prime mover
411 output shaft
42 lawn mowing blade
45 drive wheels
47 transmission shaft
471 universal joint

BEST MODE FOR CARRYING OUT THE INVENTION

Figure 1:
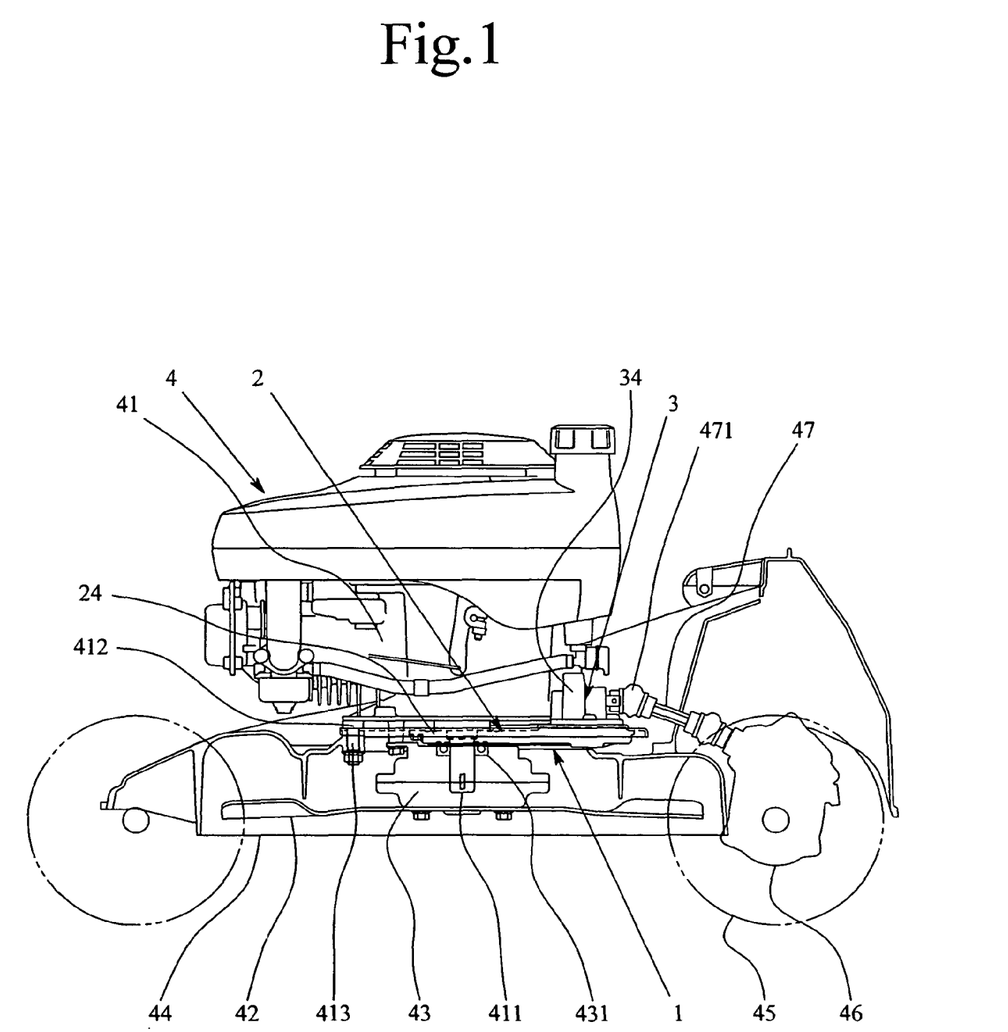
FIG. 1 is a side view showing a walking type self-traveling lawn mower attached with a transmission device of the present invention.
Figure 2:
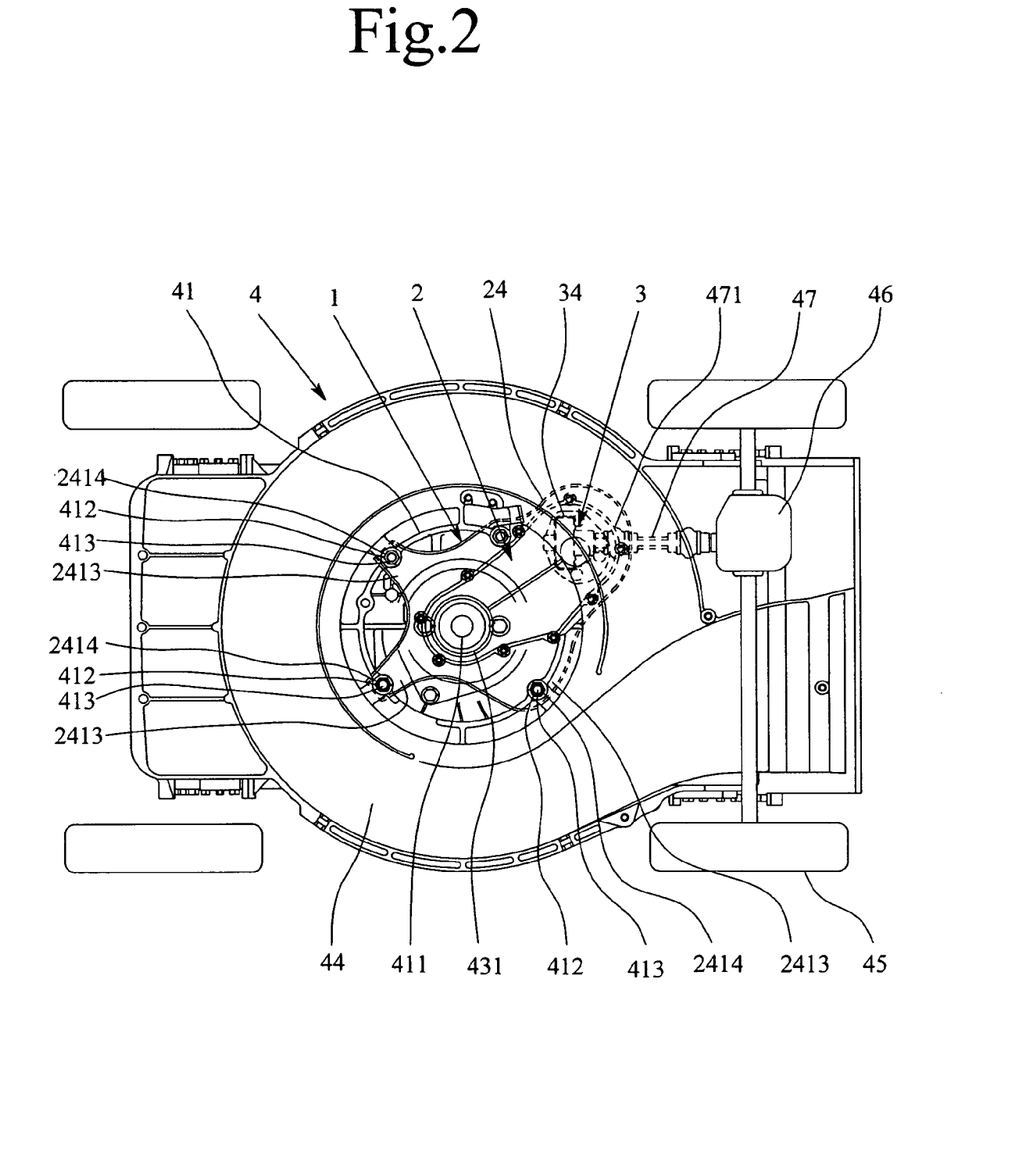
FIG. 2 is a bottom view showing the walking type self-traveling lawn mower attached with the transmission device of the present invention.
Figure 3:
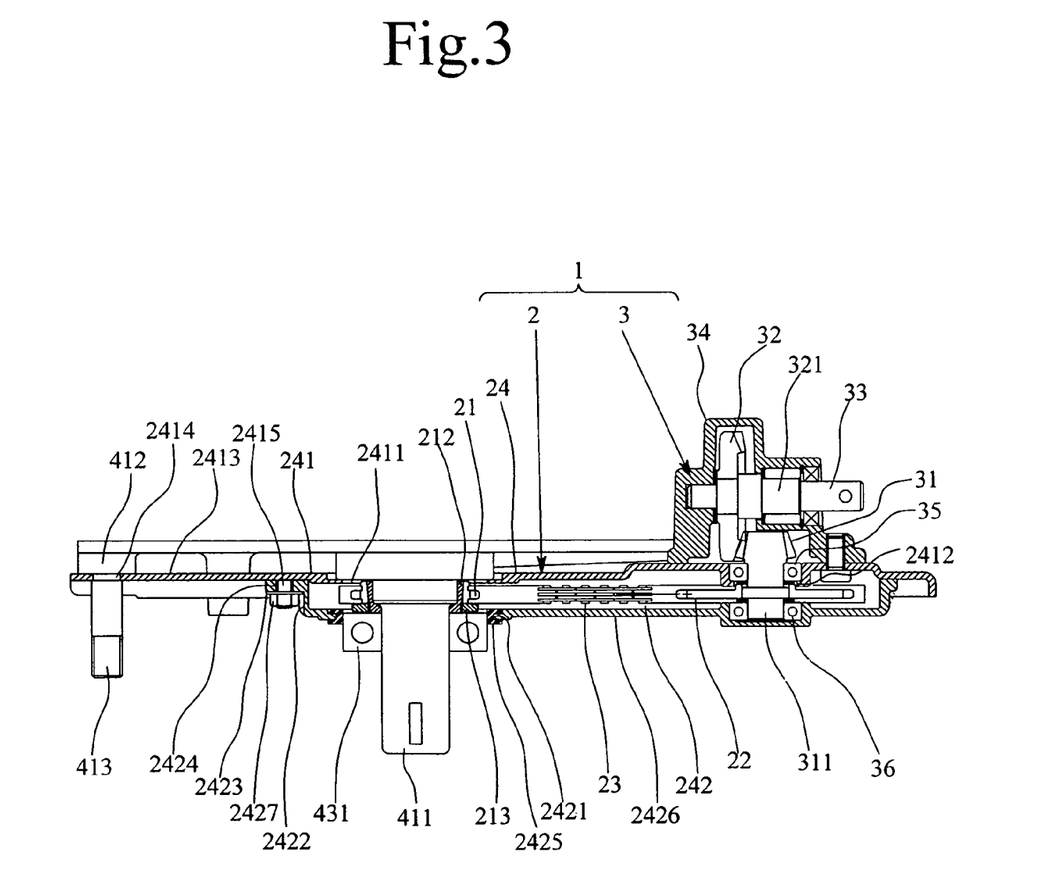
FIG. 3 is a cross sectional view showing the transmission device of the present example.
Figure 4:
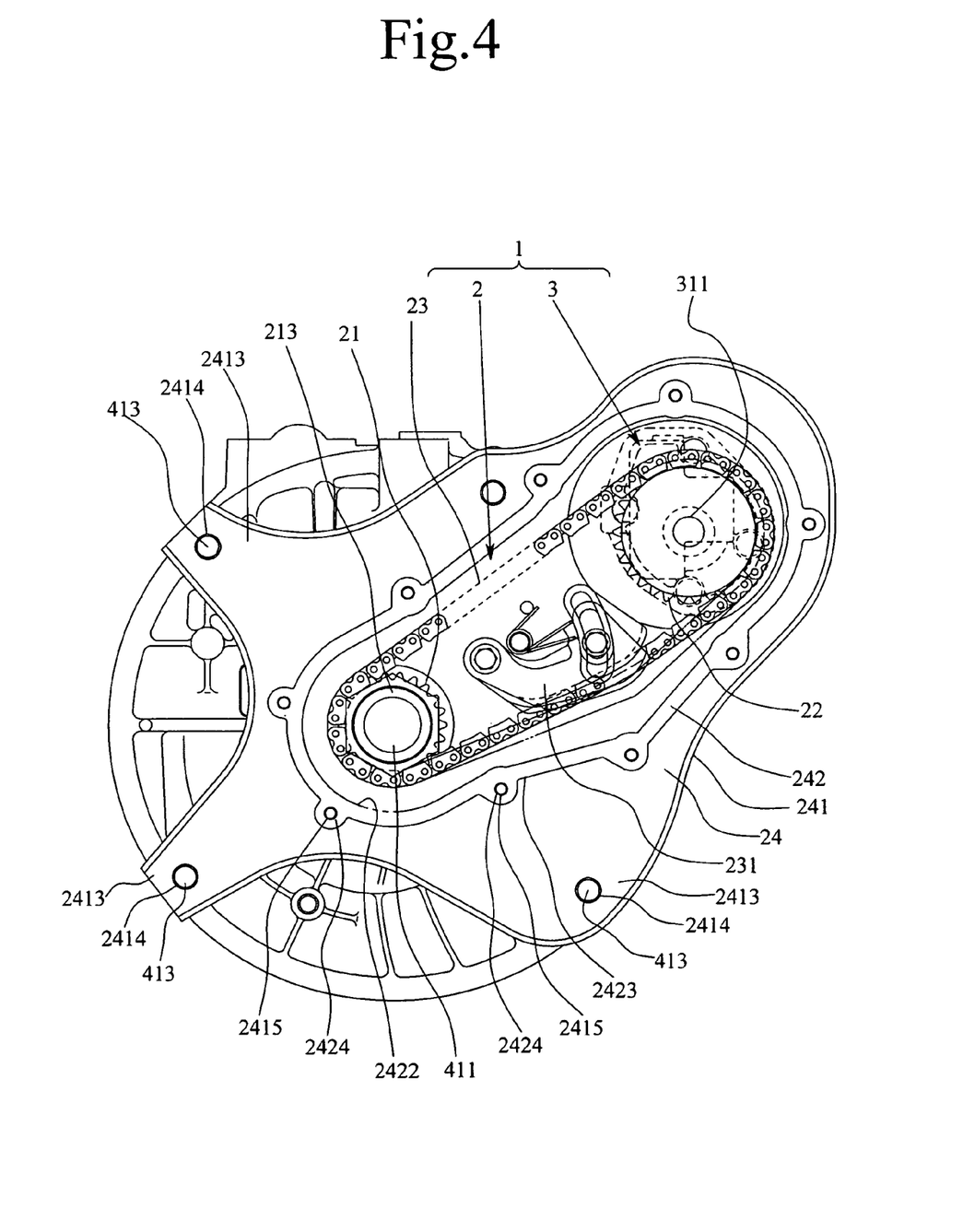
FIG. 4 is a bottom view showing a configuration of a chain drive mechanism.
Figure 5:
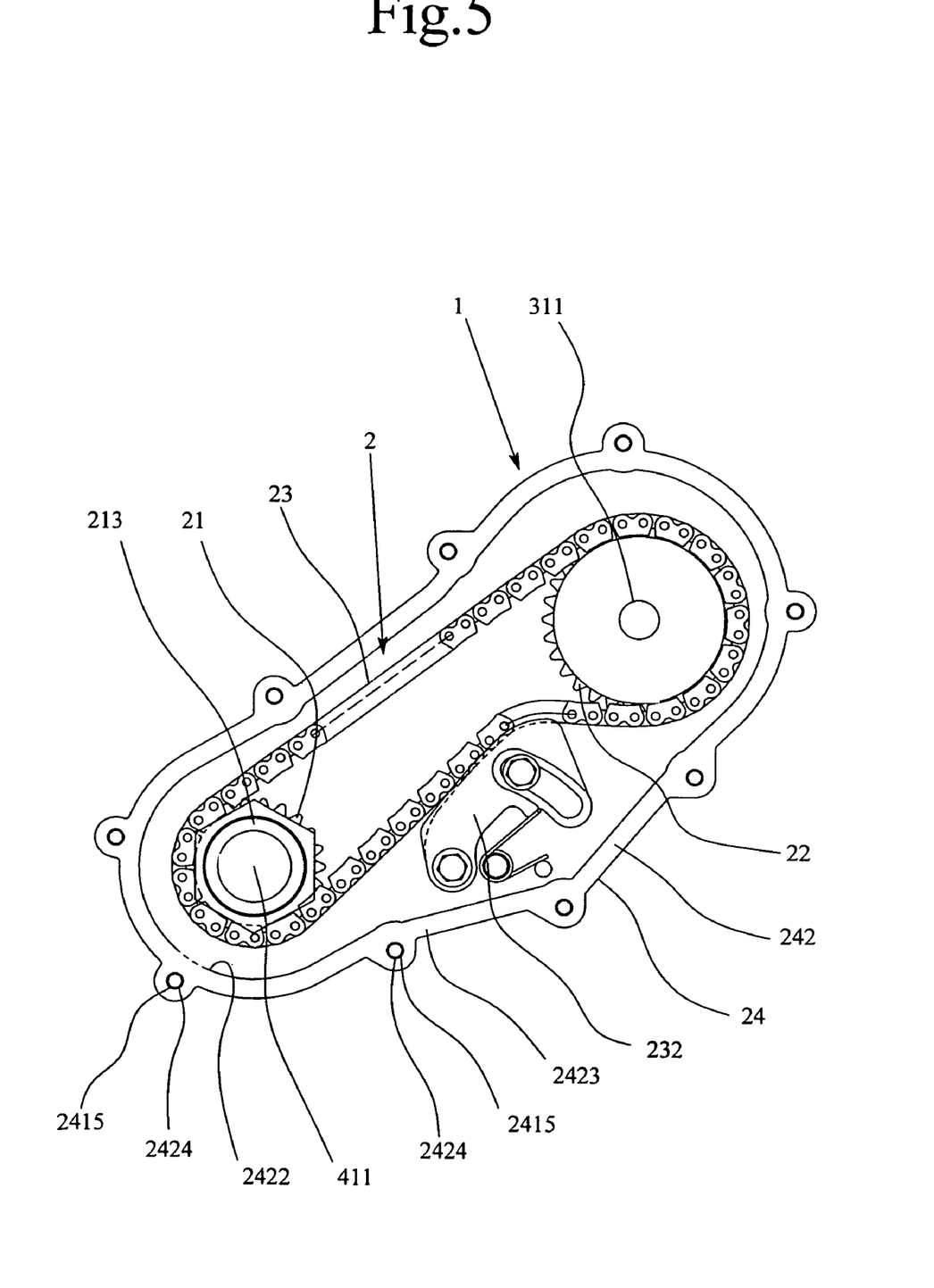
FIG. 5 is a bottom view showing a chain drive mechanism of another example.
Figure 6:
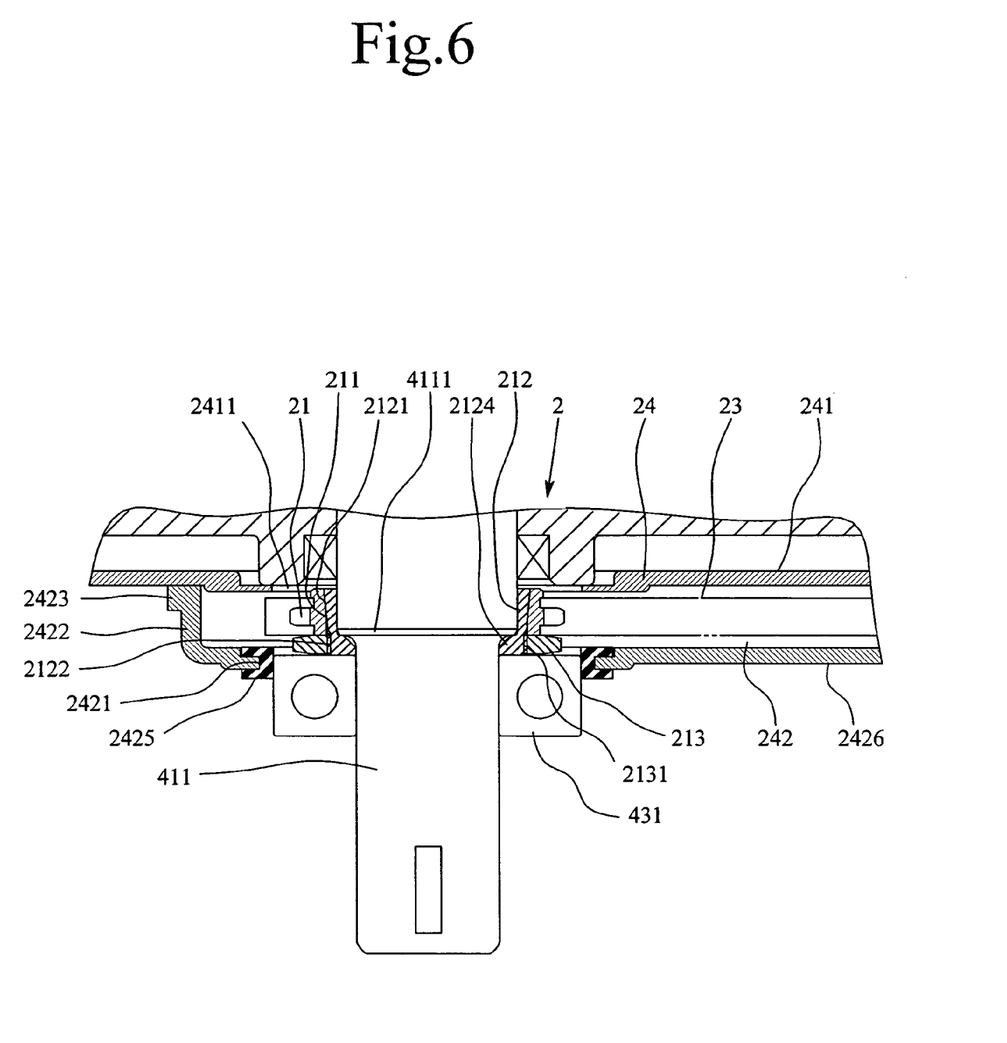
FIG. 6 is a partial cross sectional view showing an attachment relationship of a drive sprocket with respect to an output shaft.
Figure 7:
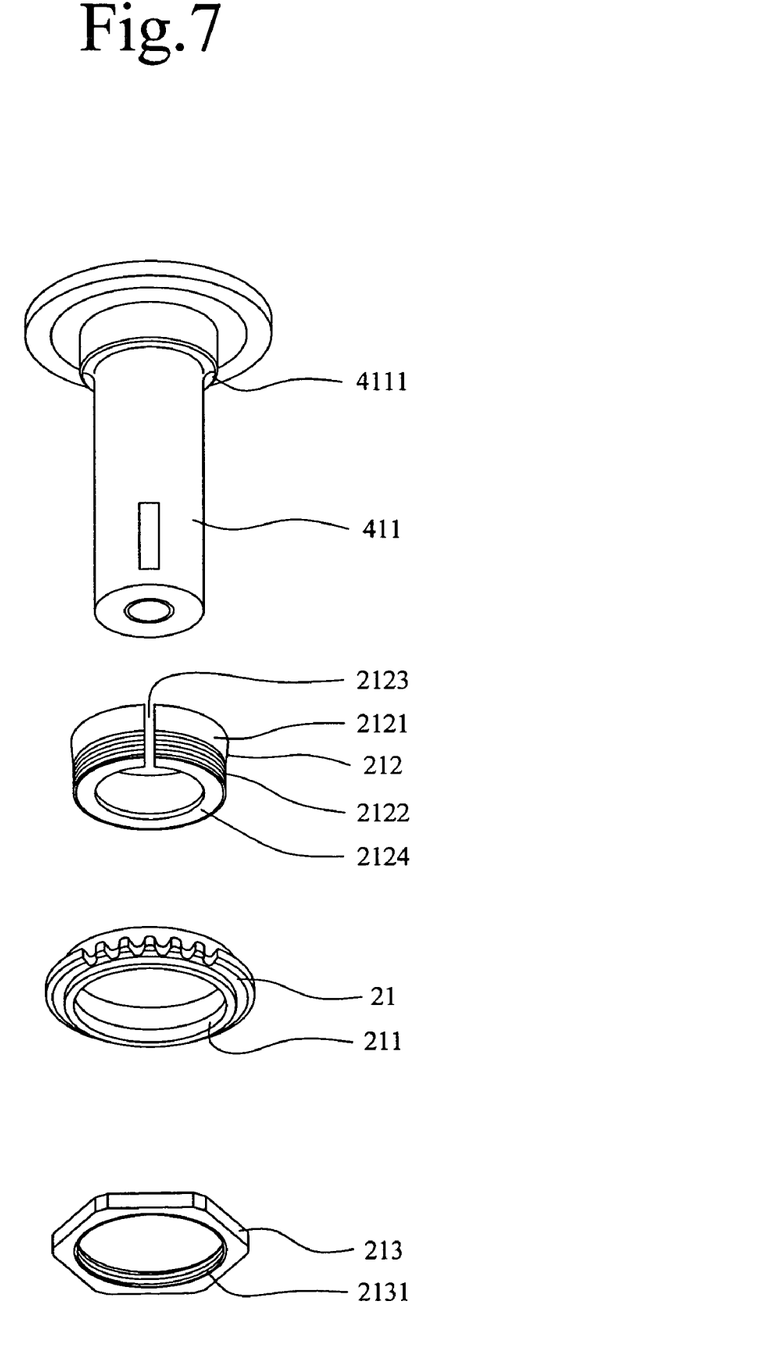
FIG. 7 is an exploded perspective view showing an attachment relationship of the drive sprocket with respect to the output shaft.
Figure 8:
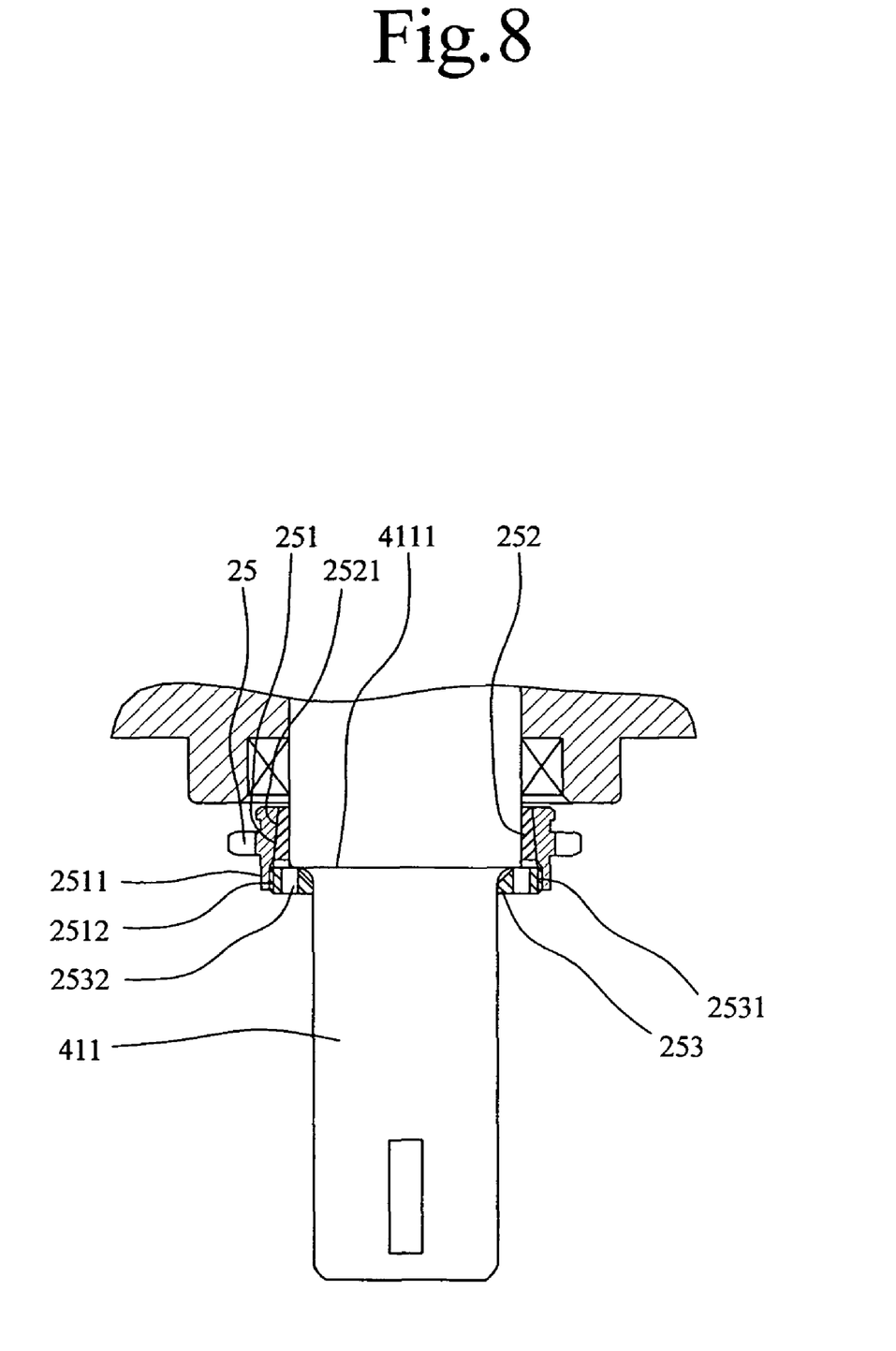
FIG. 8 is a partial cross sectional view showing an attachment relationship of another example of a drive sprocket with respect to the output shaft.
Figure 9:
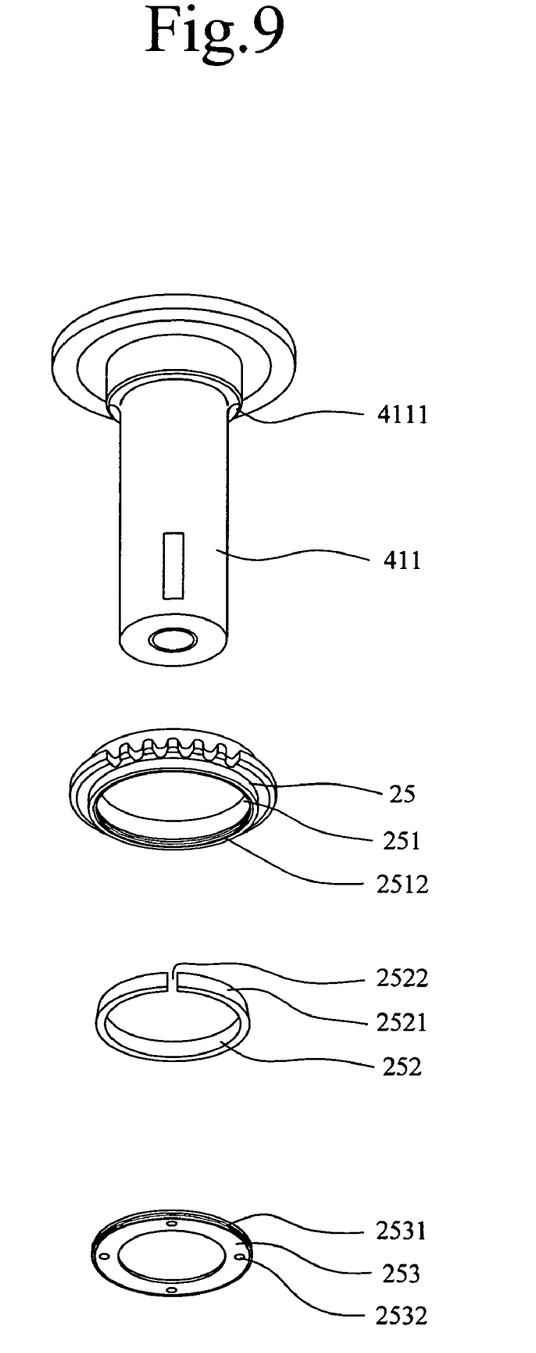
FIG. 9 is an exploded perspective view showing an attachment relationship of another example of the drive sprocket with respect to the output shaft.

The embodiments of the present invention will be hereinafter described with reference to the drawings. FIG. 1 is a side view showing a lawn mower 4 attached with a transmission device 1 of the present invention, FIG. 2 is a bottom view showing a walking type self-traveling lawn mower 4 attached with the transmission device 1 of the present invention, FIG. 3 is a cross sectional view showing the transmission device 1 of the present example, FIG. 4 is a bottom view showing a configuration of a chain drive mechanism 2, FIG. 5 is a bottom view showing the chain drive mechanism 2 of another example, FIG. 6 is a partial cross sectional view showing an attachment relationship of a drive sprocket 21 with respect to an output shaft 411, FIG. 7 is an exploded perspective view showing an attachment relationship of the drive sprocket 21 with respect to the output shaft 411, FIG. 8 is a partial cross sectional view showing an attachment relationship of a drive sprocket 25 of another example with respect to the output shaft 411, and FIG. 9 is an exploded perspective view showing an attachment relationship of the drive sprocket 25 of another example with respect to the output shaft 411. For the sake of convenience of the explanation, the illustration of an axle of a front wheel, a clutch and brake device, and a lawn mowing blade is omitted in FIG. 2.

As shown in FIG. 1 or FIG. 2, the transmission device 1 of the present invention has a configuration in which an attachment case 24 incorporating a chain drive mechanism 2 is interposed between a bottom surface of a prime mover 41 and a clutch and brake device 43 of a lawn mowing blade 42, and a rotating direction changing mechanism 3 is projected at the rear surface of a prime mover 41. The attachment case 24 is accommodated in a housing 44 with the clutch and brake device 43 and the lawn mowing blade 42. Since the housing 44 becomes large and the vehicle height of the lawn mower 4 needs to be raised when the attachment case 24 becomes thick, the attachment case 24 is desirably thin.

In the lawn mower 4 to which the present invention can be applied, the thickness allowed between the bottom surface of the prime mover 41 and the clutch and brake device 43 of the lawn mowing blade 42 is smaller than or equal to 30 mm. The attachment case 24 of the present example can be configured at about 15 mm. The transmission device 1 of the present example thus can be attached to the existing lawn mower 4 without the necessity to replace the housing 44 or change the design. The rotating power output from the rotating direction changing mechanism 3 is transmitted with an auxiliary output shaft 33 and a transmission shaft 47, which are coupled with a universal joint 471, and said transmission shaft 47 coupled to a reducing mechanism 46 of a drive wheels 45.

As shown in FIG. 3 or FIG. 4, the transmission device 1 of the present invention has the chain drive mechanism 2 configured with a drive sprocket 21, a driven sprocket 22, and a transmission chain 23 accommodated in the flat attachment case 24 fixed to the bottom surface of the prime mover 41, and the rotating direction changing mechanism 3 fixed to the upper surface of the attachment case 24 at immediately above the driven sprocket 22. The attachment case 24 of the present example is constituted by an upper surface case 241 fixed to the bottom surface of the prime mover 41, and a lower surface case 242 fixed to said upper surface case 241.

The rotating direction changing mechanism 3 is arranged on the upper surface case 241, and is fixed to the prime mover 41 through the upper surface case 241 by fixing the upper surface case 241 to the bottom surface of the prime mover 41. This has an advantage in that the work is reduced as the attachment of the transmission device 1 merely requires the fixing task of the attachment case 24, and in addition, an advantage in that positioning of the rotating direction changing mechanism 3 with respect to the chain drive mechanism 2 incorporated in the attachment case 24 becomes unnecessary.

The upper surface case 241 is a flat plate material, which surrounds the transmission chain 23 wound around the drive sprocket 21 and the driven sprocket 22 and circling on the same and which has a size or a shape allocated over a wide range with respect to the bottom surface of the prime mower 41, and is formed with an opening 2411 for passing the output shaft 411 of the prime mower 41 projecting out from the bottom surface of the prime mower 41, and a communication hole 2412 for passing a coupling shaft 311 suspended from a drive bevel gear 31 of the rotating direction changing mechanism 3. The upper surface case 241 is arranged with an attachment hole at an attachment part 2413 jutting out in four directions with the opening 2411 as the center, and a plurality of connection bolts 2415 communicating with a connection hole 2424 of the lower surface case 242 described below.

Thus, the upper surface case 241 of the present example is fixed to the bottom surface of the prime mover 41 by screw-fitting a stud bolt 413 to a bolt hole 412 with each attachment hole 2414 communicated to the bolt hole 412 formed at the bottom surface of the prime mover 41 and while being applied to the bottom surface of the prime mover 41. The housing 44 of the lawn mowing blade 42 is attached to an opposing surface of the prime mover 41 using the stud bolt 413 projecting out from the attachment hole 2414 of the upper surface case 241. The opening 2411 of the upper surface case 241 is not sealed with respect to the output shaft 411, so that excessive pressure in the attachment case 24 can escape to the outside from a gap of the opening 2411 and the output shaft 411. In addition, the upper surface case 241 of the present example pivotally attaches a chain tensioner 231. The chain tensioner 231 pushes the inner side of the circling path of the transmission chain 23. The chain tensioner 232 may push the outer side of the circling path of the transmission chain 23 by being pivotally attached to the upper surface case 241 (see FIG. 5).

The lower surface case 242 is a flat dish shaped member, which surrounds the transmission chain 23 wound around the drive sprocket 21 and the driven sprocket 22 and circling on the same and which includes a peripheral surface 2422 and a lower surface 2426 having a size or a shape taking into consideration the bulge of the circling path of the transmission chain 23 by the chain tensioner 231, and is formed with an opening 2421 coaxial with the opening 2411 of the upper surface case 241 to pass the output shaft 411 therethrough. The chain drive mechanism 2 of the present example accommodates the drive sprocket 21, the driven sprocket 22, and the transmission chain 23 in a range of the depth (height of peripheral surface 2422) of the lower surface case 242.

The lower surface case 242 of the present example is formed with a connection hole 2424 in plurals at a flange 2324 jutting out from the peripheral surface 2422, and is integrated with the upper surface case 241 by a nut 2427 with the connection hole 2424 communicated to the connection bolt 2415 of the upper surface case 241. The opening 2421 of the lower surface case 242 is attached with a seal ring 2425, and slidably contacts the seal ring 2425 with respect to a bearing 431 of the clutch and brake device 43 fitted to the output shaft 411 (see FIG. 6). The attachment case 24 is in a sealed state other than at the gap of the opening 2411 with respect to the output shaft 411 of the upper surface case 241, and the grease (not illustrated, semisolid or paste lubricant) filled in the attachment case 24 will not leak downward.

The chain drive mechanism 2 is constituted by winding the transmission chain 23 including a silent chain around the drive sprocket 21 attached to the output shaft 411 and the driven sprocket 22 securely fixed to the coupling shaft 311 suspended from the drive bevel gear 31 of the rotating direction changing mechanism 3 arranged at the upper surface case 241. The drive sprocket 21, the driven sprocket 22, and the transmission chain 23 are enveloped with grease filled in the attachment case 24, so that smooth rotation and circling are guaranteed.

However, the noise inevitably becomes large with the normal chain as the drive sprocket 21 rotates at a constant speed (about 3000 rpm) which is same as that of the output shaft 411. In this regards, the gear drive mechanism is not preferable, though it can be used in the present invention, as the noise becomes larger. The present example thus uses a silent chain for the transmission chain 23. The chain drive mechanism 2 of the present example has a configuration in which the silent chain of lesser noise in circling than the normal chain is enveloped, as the transmission chain 23, with grease along with the drive sprocket 21 and the driven sprocket 22, and accommodated in the attachment case 24, whereby a very quiet circling of the transmission chain 23 can be realized.

As seen in FIG. 6 and FIG. 7, the drive sprocket 21 of the present example is fitted with pressure and attached to the output shaft 411 while being sandwiched by a taper ring 212 and a tightening nut 213, and can be easily detached by loosening the tightening nut 213. The taper ring 212 has a substantially cylindrical shape with a male screw 2122 formed at the lower portion of a reverse circular cone shaped outer peripheral surface 2121, and arranged with a slit 2123 dividing the outer peripheral surface 2121 and the male screw 2122 in the peripheral direction, where a stopper 2124 to be hooked at a step difference part 4111 of the output shaft 411 is arranged at the inner peripheral side of the lower edge. The drive sprocket 21 is formed with an attachment hole 211 to be externally fitted to the outer peripheral surface 2121 of the taper ring 212. The tightening nut 213 is a substantially flat nut having a male screw 2131 formed on the inner peripheral surface, where the upper surface contacts and pushes the drive sprocket 21 upward.

The attachment procedure of the drive sprocket 21 in the present example is as follows. First, the taper ring 212 is externally fitted to the output shaft 411, the attachment hole 211 of the drive sprocket 21 is then externally fitted to the outer peripheral surface 2121 of the taper ring 212, and the tightening nut 213 is screw-fitted to the male screw 2122 of the taper ring 212. The taper ring 212 is thereby bonded to the output shaft 411 with pressure by the tightening nut 213, and the drive sprocket 21 is sandwiched by the taper ring 212 and the tightening nut 213. The tightening nut 213 can be rotated with a normal tool. The tightening nut 213 positioned at the lower portion of the drive sprocket 21 plays the role of the guide which supports the transmission chain 23 wound around the drive sprocket 21 from downward.

As shown in FIG. 8 and FIG. 9, the drive sprocket 25 can be removably attached to the output shaft 411 by pushing the taper ring 252 into a gap between the attachment hole 251 of the drive sprocket 25 and the output shaft 411 by a tightening nut 253. The taper ring 252 has a circular ring shape so as to be inserted into the gap between the attachment hole of the drive sprocket 25 externally fitted to the output shaft 411 and the output shaft 411, and is arranged with a slit 2522 for dividing a circular cone shaped outer peripheral surface 2521 in the peripheral direction. The drive sprocket 25 is arranged with the attachment hole 251 to which the taper ring 252 can be inserted between the output shaft 411 and the drive sprocket 25 itself, and is formed with a female screw 2512 at the inner peripheral surface of an attachment rib 2511 lowering towards the lower side. The tightening nut 253 has a flat circular ring shape having the male screw 2531 formed on the outer peripheral surface.

The attachment procedure of the drive sprocket 25 in another example is as follows. First, the attachment hole 251 of the drive sprocket 25 is externally fitted to the output shaft 411, the taper ring 252 is then inserted into the gap between the output shaft 411 and the attachment hole 251 of the drive sprocket 25, and the tightening nut 253 is screw-fitted to the female screw 2512 of the drive sprocket 25. The tightening nut 253 then pushes the taper ring 252 upward, so that the taper ring 252 is press-fitted between the output shaft 411 and the attachment hole 251 of the drive sprocket 25, and the drive sprocket 25 is bonded to the output shaft 411 with pressure via the taper ring 252. The tightening nut 253 has a flat circular ring shape, and is rotated by a dedicated tool (not shown) to attach to an engagement hole 2532 formed in the tightening nut 253 as it is difficult to be rotated with a normal tool. It has to be screwed into the drive sprocket 25.

The chain drive mechanism 2 can transmit the rotating power from the drive sprocket 21 to the driven sprocket 22 via the transmission chain 23, and can provide the function of the reducing mechanism by setting the gear ratio of the driven sprocket 22 with respect to the drive sprocket 21 to greater than one. The chain drive mechanism 2 of the present example reduces the rotating power of about 3000 rpm output from the output shaft 411 to about 2000 rpm by setting the gear ratio to 1.5, and transmits the same to the drive bevel gear 31 of the rotating direction changing mechanism 3.

The reduction ratio by the chain drive mechanism 2 can be easily increased by miniaturizing the drive sprocket 21 in accordance with the output shaft 411, and enlarging the driven sprocket 22 in the range of the bottom surface of the prime mover 41 or the range of the housing 44 of the lawn mowing blade 42. Although the reduction can also be realized with the rotating direction changing mechanism 3 as hereinafter described, a means for increasing the gear ratio of the chain drive mechanism 2 is usable when a high reduction ratio is needed.

As shown in FIG. 3, the rotating direction changing mechanism 3 is constituted by the drive bevel gear 31, the driven bevel gear 32, and the auxiliary output shaft 33 accommodated in a gear case 34 fixed to the upper surface case 241 described above. The drive bevel gear 31 has the suspending coupling shaft 311 supported by an upper bearing 35 held by the upper surface case 241 and a lower bearing 36 held by the lower surface case 242, where the coupling shaft 311 is suspended through the communication hole 2412 formed in the upper surface case 241, and the driven sprocket 22 is securely fixed to the coupling shaft 311. Thus, the drive bevel gear 31 rotates horizontally at a constant speed with the driven sprocket 22. The driven bevel gear 32 has the rotation shaft 321 supported by the gear case 34, and rotates vertically while meshing with the drive bevel gear 31. The auxiliary output shaft 33 is the portion obtained by extending one end of the rotation shaft 321 to project out from the gear case 34. The transmission shaft 47 is coupled to an end of the auxiliary output shaft 33 via the universal joint 471 (see FIG. 1 and FIG. 2).

The rotating direction changing mechanism 3 transmits the rotating power between the drive bevel gear 31 and the driven bevel gear 32, which mesh with each other, and provides the function of the reducing mechanism by setting the gear ratio of the driven bevel gear 32 with respect to the drive bevel gear 31 to greater than one. The rotating direction changing mechanism 3 of the present example reduces the rotating power of about 2000 rpm transmitted from the drive sprocket 22 to about 600 rpm by setting the gear ratio to 3.3, and outputs the same from the auxiliary output shaft 33 to be transmitted to the transmission shaft 47 (see FIG. 1 and FIG. 2)

As described above, the reduction of the rotating power can also be achieved with the chain drive mechanism 2, which can be combined with the reduction by the rotating direction changing mechanism 3 so that the transmission device 1 of the present example obtains a large reduction ratio as a whole. However, a separate reducing mechanism 46 is necessary for the drive wheels 45 since the rotating power output from the auxiliary output shaft 33 still has a high rotation number (about 600 rpm in the above) to directly drive the drive wheels 45, but the reducing mechanism 46 of the drive wheels 45 can be miniaturized as the rotating power can be reduced by the transmission device 1 of the present invention. This is a secondary effect of the present invention.

The invention claimed is:

1. A transmission device of a walking type self-traveling lawn mower, for branching a rotating power from an output shaft vertically projected from a prime mover mounted on a vehicle body and transmitting the rotating power to drive wheels, comprising a chain drive mechanism and a rotating direction changing mechanism; wherein the chain drive mechanism is constituted by accommodating a drive sprocket fitted to the output shaft and rotating horizontally, a driven sprocket connected to the rotating direction changing mechanism and rotating horizontally, a transmission chain wound around said drive sprocket and said driven sprocket, a chain tensioner pressing a circling path of the transmission chain from an inner side to prevent loosening of the transmission chain, in a flat attachment case fixed to the vehicle body or the prime mover; and the rotating direction changing mechanism is constituted by a drive bevel gear coaxial with the driven sprocket rotating horizontally, a driven bevel gear meshed with the drive bevel gear rotating vertically, and an auxiliary output shaft coaxial with the driven bevel gear and rotating vertically.

2. The transmission device of the walking type self-traveling lawn mower according to claim 1, wherein the drive sprocket is attached to the output shaft by forming a male screw at a lower portion of a reverse circular cone shaped outer peripheral surface of a taper ring, externally fitting the taper ring, having a slit dividing the outer peripheral surface and the male screw in the peripheral direction, to the output shaft of the prime mover, externally fitting the drive sprocket to the outer peripheral surface of the taper ring, screw fitting a tightening nut having a female screw formed on an inner peripheral surface to the male screw of the taper ring, bonding the taper ring with pressure to the output shaft by the screw-fitting of the tightening nut, and sandwiching the drive sprocket with the taper ring and the tightening nut.

3. The transmission device of the walking type self-traveling lawn mower according to claim 1, wherein the drive sprocket is attached to the output shaft by externally fitting the drive sprocket having a female screw formed at a lower portion of an inner peripheral surface, inserting a circular cone shaped taper ring having a slit dividing a circular cone shaped outer peripheral surface in the peripheral direction between the output shaft of the prime mover and the inner peripheral surface of the drive sprocket, screw fitting a tightening nut having a male screw formed on an outer peripheral surface to the female screw of the drive sprocket, and fitting the taper ring with pressure between the output shaft of the prime mover and the inner peripheral surface of the drive sprocket by the screw-fitting of the tightening nut.

4. The transmission device of the walking type self-traveling lawn mower according to claim 1, wherein the chain drive mechanism uses a silent chain for the transmission chain.

5. The transmission device of the walking type self-traveling lawn mower according to claim 1, wherein the attachment case is constituted by forming an opening enabling the output shaft of the prime mover to pass therethrough on an upper surface and a lower surface, the opening formed on the upper surface passing the output shaft, the opening formed on the lower surface attaching a seal ring, and slidably contacting the seal ring to the output shaft and closing the opening; and the attachment case is filled with semisolid or paste lubricant.

* * * * *